Figure 1:
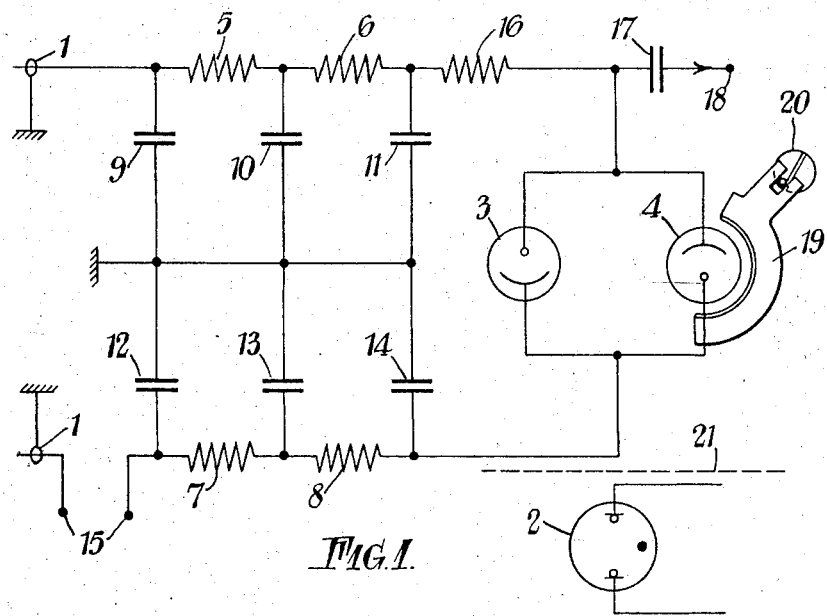

March 24, 1959  F. V. A. E. ENGEL ET AL  2,879,469
ION-CONCENTRATION MEASURING AND/OR CONTROLLING APPARATUS
Filed Dec. 14, 1954  3 Sheets-Sheet 1

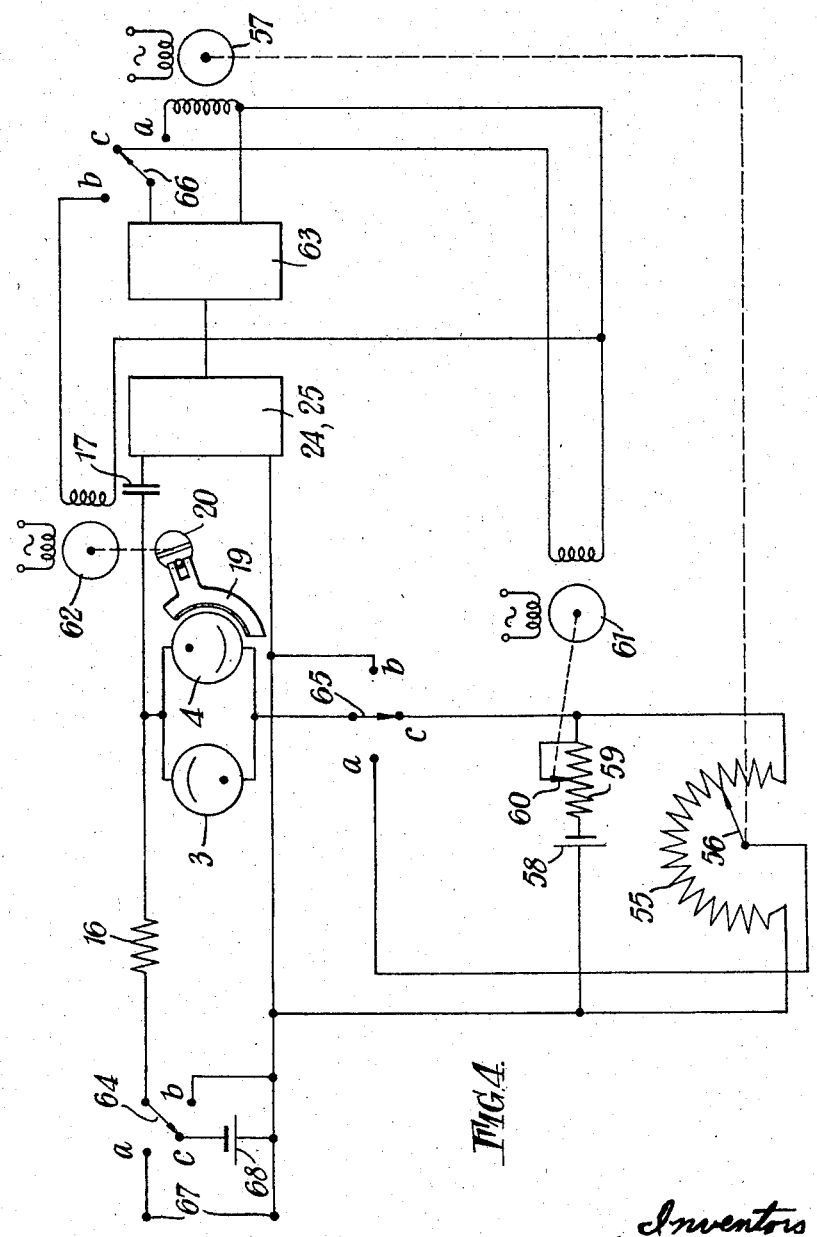

2,879,469

ION-CONCENTRATION MEASURING AND/OR CONTROLLING APPARATUS

Friedrich Viktor Anton Ernst Engel and Günther Friedrich Mario Engel, Park Royal, London, England, assignors to Electroflo Meters Company Limited, London, England Application December 14, 1954, Serial No. 475,145

Claims priority, application Great Britain January 1, 1954

13 Claims. (Cl. 324—30)

This invention concerns improvements relating to ion-concentration measuring or measuring and controlling apparatus in which a high-impedance sensing element, such as a glass electrode, provides a measure of the concentration in the form of a D.C. voltage.

In apparatus in which a sensing element could not be loaded directly with a usual current-measuring instrument, it has been proposed to employ direct-coupled D.C. amplifiers. In order to overcome the inherent tendency of these D.C. amplifiers to zero drift, it has been further proposed to convert the direct current output of the sensing element into an alternating current or intermittent direct current by means of vibratory mechanical elements such as vibrating-contact or vibrating-condenser converters. The vibrating-contact converter is essentially a low impedance converter and is not basically suitable where freedom from spurious responses is required in high-resistance circuits. Although the vibrating condenser is a high-impedance converter and has been used in circuits of very high resistance, it is not free from contact potentials and therefore requires adjustment before use. A particular object of the invention is to provide apparatus by which these difficulties are avoided.

According to the present invention, ion-concentration measuring or measuring and controlling apparatus comprises an ion-concentration sensing element of high impedance, such as a glass electrode, and a converter for converting the D.C. voltage obtained from the said element into a voltage of periodically varying magnitude, i.e. an A.C. or intermittent D.C. voltage, the said converter comprising a source of illumination, two light-responsive cells of the photoemissive type arranged to be illuminated by the said source and connected in parallel and in opposition to each other, means for applying a negative feedback voltage to the said cells in series opposition to the said D.C. voltage, means for modulating the intensity of illumination of the said cells by the said source, and adjustable optical stop means which is arranged in the illuminating path between the said source and cells and by which at least one of the said cells can be partially occluded. The source of illumination may have its intensity periodically varied or the illumination of the cells by the source may be periodically interrupted or obscured.

Such apparatus may also comprise an amplifier connected between the converter and a demodulator adapted for converting the amplifier output into a direct current for operating indicating, recording and/or controlling means and for providing the negative feedback voltage. The demodulator may be a phase-sensitive demodulator.

Apparatus in accordance with the invention may be used in conjunction with a self-balancing device. In this case, the demodulator may be arranged to provide current for the operation of the self-balancing device.

Apparatus in accordance with the invention lends itself to the provision in particularly simple manner of manual or automatic adjustment or compensation means. This is especially advantageous in such apparatus which includes indicating, recording and/or controlling means of a self-operated or servo-operated type.

For example, in glass-electrode apparatus for the measurement of ion concentration, a zero correction potential can readily be provided to compensate for the asymmetry potential of the glass electrode. Provision may also be readily made to compensate for the effect of temperature on a glass electrode or other sensing element.

In particular, the optical stop or stops can be utilised to provide a zero-correction potential for compensating for the asymmetry potential.

The invention is also concerned with provisions for balancing the responses of the photocells and with means for standardizing a reference voltage provided by the self-balancing device.

Figure 2:
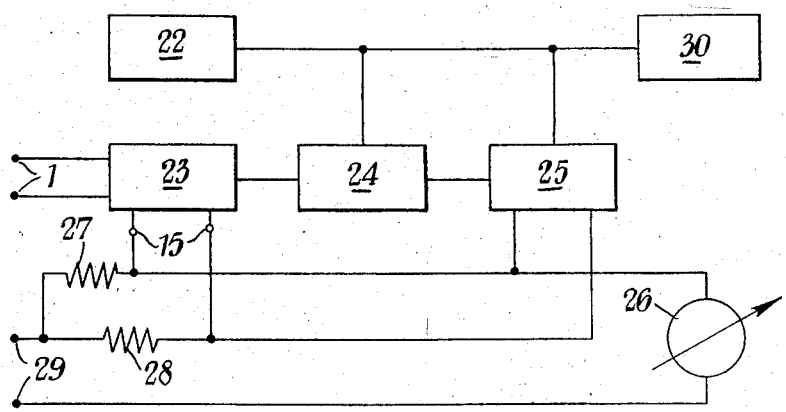
Figure 3:
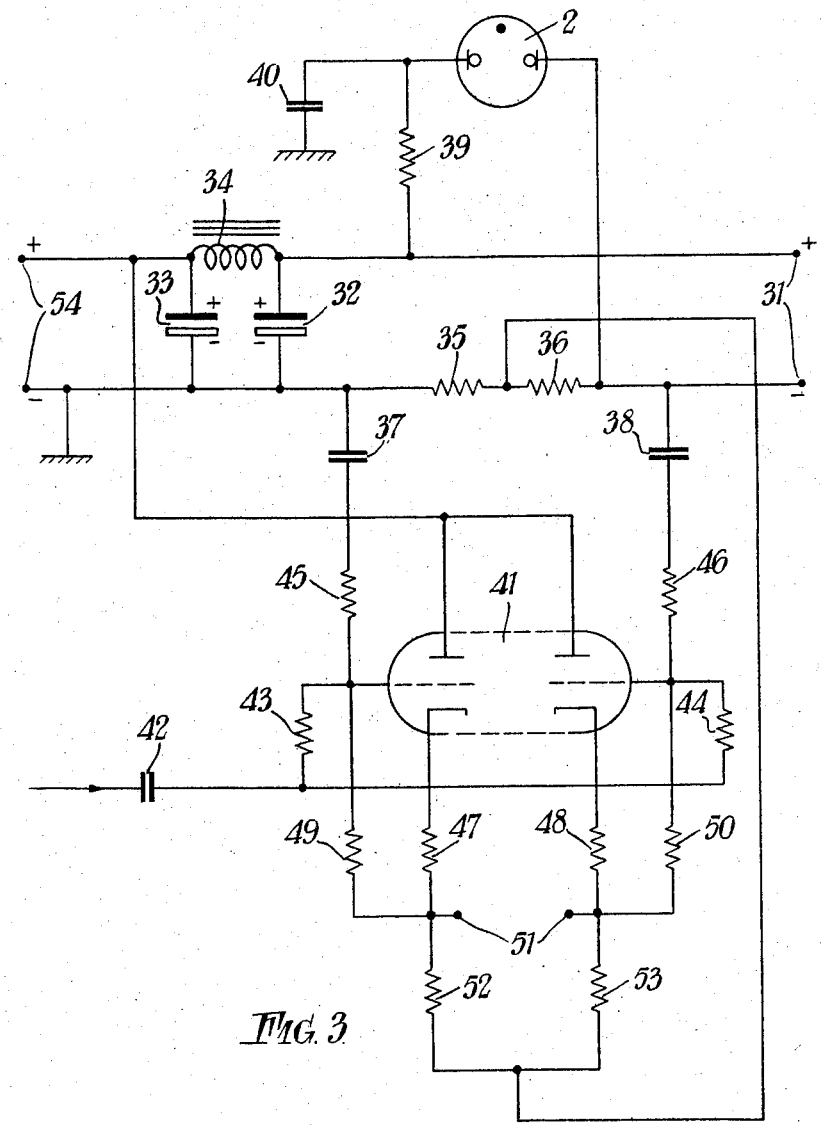

Embodiments of the invention will now be more fully described by way of example and with reference to the accompanying diagrammatic drawings, in which:

Figure 1 represents a photocell converter together with a filter circuit,

Figure 2 a block diagram of a preferred embodiment of the invention comprising a converter, an amplifier and a phase-sensitive demodulator for providing negative D.C. voltage feedback, Figure 3 a preferred means for obtaining modulating voltage for the converter and reference-phase voltages for the demodulator, and Figure 4 one manner of applying the converter to a self-balancing arrangement.

The arrangement illustrated in Figure 1 is intended to be used in connection with glass-electrode apparatus for ion-concentration measurement. Screened D.C. input terminals connected to such apparatus are indicated at 1. A modulator lamp in the form of a neon glow lamp 2 is arranged to illuminate intermittently two photocells 3 and 4 of the photo-emissive type which are connected in parallel and in opposition. Between the terminals 1 and the photocells 3 and 4, there is a filter consisting of resistors 5, 6, 7 and 8 condensers 9, 10, 11, 12, 13, 14. Terminals 15 serve for the introduction of a negative feedback voltage in series opposition to the input voltage, as hereinafter described. On one side, the photocells 3, 4 are connected through a resistance 16 to the filter and are coupled by a condenser 17 to the input terminal 18 of an amplifier which may be a conventional resistance-capacity coupled amplifier with one or more stages. The amplifier output may be used directly to actuate a voltmeter or other indicating means, recording and/or controlling means, which may include a self-balancing arrangement.

The illumination of the photocells 3, 4 causes their cathodes to emit electrons whose energy will depend upon the frequency of the illumination by the lamp 2. A current will, therefore, flow between the cells, but no voltage will apear in the external circuit if both cells are adjusted to give equal response. If, however, there is a positive or negative potential across the potential divider consisting of the resistor 16 and the cells 3 and 4, a periodic voltage will appear at the output terminal 18 of the condenser 17 and consequently at the input of the amplifier connected thereto. For initially balancing the responses of the photocells, an adjustable optical stop or stops is or are provided for one or both of the photocells. As illustrated, the stop 19 is an arcuate screen which is circumferentially adjustable by a crank 20, but stops or screens of other form, for example of wedge form, may be used for occluding part or parts of one or both photocells. Two similar stops may be provided for adjusting the two cells, or a coarse adjustment and a fine adjustment.

may be provided, using stops of different sizes. By such means, it is possible effectively to balance the responses of the cells so that no periodic output is produced as long as there is no difference between the input and negative feedback voltages.

The periodic output voltage of the converter may, for instance, follow a sine law or a square-wave law. If the condenser 17 is regarded as part of the converter, then the output is an alternating voltage of an amplitude directly proportional to the input direct voltage. If the condenser 17 is not regarded as part of the converter, then the output is a direct voltage of periodically varying magnitude and having an amplitude directly proportional to the input direct voltage.

Wire mesh 21 is placed between the lamp 2 and the photocells 3, 4 for screening the latter electrostatically and preventing capacitative pickup of the modulating frequency by the input circuit. Alternatively, the lamp 2 may be arranged in a separately screened compartment and the light reflected on to the cells by one or more mirrors.

The adjustable stop or stops may be used also to provide a compensating voltage if it is desired to correct for a small input error potential. For this purpose, the error potential is applied to the input circuit and the stop or stops are readjusted until the output of the converter is again zero. This is useful if compensation is desired for the asymmetry potential of a glass electrode, which is an example of such an error potential, as it is difficult to introduce the required potential without an additional stabilised power supply or battery. The compensating voltage, or zero-correction voltage, generated by the photocells 3, 4 depends on the illumination of each cell and on the frequency of the light. Each cell may be regarded as a voltage source whose voltage can be varied by varying the frequency of the light and whose internal resistance can be varied by varying the level of illumination. As both cells are illuminated by the same source and their internal resistances have been adjusted by the stop means so that a certain output voltage is obtained, any subsequent variation of the illumination level will have no effect on the output voltage, since both cells are equally affected. Furthermore, the frequency of the light produced by the lamp 2 does not depend on the lamp current, provided that the lamp is not overloaded and an arc discharge produced. The voltage generated by the cells will thus be independent of the lamp current and, therefore, of the mains voltage and stable compensation can be obtained.

The necessity for compensating for the asymmetry potential of the glass electrode in ion-concentration measurement arises from the fact that the temperature correction applied to the output is proportional to both the temperature of the electrodes and to the output voltage of the pH meter which is equal to its input voltage. As, however, part of the input voltage, namely the said asymmetry potential, is independent of temperature, compensation for temperature should not be applied to this voltage. On the other hand, since this potential is independent of the ion-concentration, it can be compensated for by a separate compensating voltage, in this case the voltage provided by adjustment of the cell screening. The resultant input to the pH meter will be the pH-dependent and temperature-dependent electrode potential only and the temperature compensation which is applied to this potential will now produce a correct effect.

The periodic output voltage of the converter depends upon the potential difference applied across the filter, i.e. upon the difference between the input and negative feedback voltages. The disposition of the filter between the input terminals 1 and the feedback terminals 15 on one side and the converter on the other side ensures that the two voltages pass through the same filter and are retarded by the same amount and that the amplifier stability is not adversely affected by changes in resistance of the glass electrode, since the negative feedback voltage passing through the resistances of the electrode and filter is affected by the same time constant as the voltage produced by the electrode. The time constant, which depends to some extent upon the temperature of the glass electrode, whose resistance is temperature-dependent, can then change due to temperature changes of the electrode without adversely affecting the stability of the system.

In a preferred arrangement shown in Figure 2, in which the lamp unit, photocell converter and amplifier are indicated by 22, 23 and 24 respectively, the output of the amplifier 24 is fed to a phase-sensitive demodulator or rectifier 25 which may be of the square-law or carrier-switch type. The D.C. output voltage of the demodulator is fed back to the terminals 15 with such a sense that the difference between the input voltage and the feedback voltage tends to zero. The circuit arrangement is therefore self-balancing. The said output voltage, which is also fed to indicating, recording and/or controlling means 26 through resistors 27, 28 and through an automatic temperature compensator connected to terminals 29, tends to equality with the input voltage, if the amplifier gain is high enough. A power-supply unit fed from the A.C. mains is indicated at 30.

The high degree of negative feedback employed ensures that variations in the amplifier characteristics, such as occur due to main-voltage fluctuations and due to ageing of the amplifier valves, do not noticeably affect the overall voltage gain of the amplifier which, in the example shown, may remain between 1 and approximately 0.999. Furthermore, the negative feedback introduces two other advantages: It increases the input resistance considerably and reduces the output resistance, thus reducing any drift in the output circuit due to changes in mains voltage and in the circuit resistance of the indicating or like means.

The temperature compensator may take the form of a temperature-dependent resistance dimensioned so that the effect of temperature on the electrode chain is compensated for by variation of the aforesaid circuit resistance.

A preferred form of demodulator and of means for obtaining simultaneously an excitation voltage for the modulator lamp 2 and reference phase voltages for the demodulator is shown in Figure 3. The input terminals 31 are connected to the A.C. supply through full-wave power-supply rectifier. Pulsating direct current from the rectifier is supplied directly to the positive plate of a condenser 32 which, with a condenser 33 and choke 34 forms a filter. The negative side of the rectifier is connected to the chassis through resistors 35 and 36. The pulsating voltages appearing, due to the said pulsating current, at the connections of condensers 37 and 38 to resistors 45 and 46 respectively are 180° out of phase with respect to each other and 90° out of phase with respect to the potential at the connection between the resistors 35 and 36. The frequency of the pulsating voltages is twice mains frequency, that is 100 c.p.s. if the mains frequency is 50 c.p.s. The direct current necessary for the operation of the lamp 2 is supplied through a resistor 39. The pulsating voltage necessary for the modulation is developed across the resistors 35 and 36 is fed to the lamp 2 with the assistance of a condenser 40.

A phase-sensitive and synchronous demodulator comprises a double triode valve 41 to whose grids the output voltage from the amplifier 24 is fed by means of a condenser 42 and resistors 43 and 44. The above-mentioned voltages are fed, as reference phase voltages, to the grids through the resistors 45 and 46 and negative grid bias produced by resistors 47 and 48 is fed to the said grids through resistors 49 and 50. The cathodes of the valve 41 are connected to the point between the resistors 35, 36 through resistors 52, 53. The anodes of the valve are connected to the output side of the filter 32–34 where there are also output terminals 54 for supplying other components for which direct current is required.

If the amplifier output is in phase with the reference voltage applied to the grid of one of the triodes, the average anode current of that triode will rise and the average anode current of the other triode will fall due to the phase difference of 180° between the amplifier output and the reference phase voltage. The changes in anode current will produce a voltage across the D.C. output terminals 51. This voltage is supplied to feedback terminals in the input circuit preceding the amplifier i.e. the terminals 15 in Figures 1 and 2 and is also supplied to the indicating or recording means.

In connection with this phase-sensitive demodulator, it is alternatively possible to use direct excitation of the lamp 2 from 50 c.p.s. mains to provide 100 c.p.s modulation. It is also possible to obtain 50 c.p.s. modulation of the lamp by providing a suitable D.C. bias voltage in addition to the 50 c.p.s. voltage.

When apparatus such as has been described above is applied to a self-balancing indicating or recording device, the arrangement shown in Figure 4 may be employed for standardizing the apparatus. In this figure, the self-balancing device is indicated as a balancing slide wire 55 whose contact 56 can be driven by a reversible motor 57. A reference voltage is made available by a battery 58 connected in series with a potentiometer or rheostat 59 whose movable contact 60 can be driven by a reversible motor 61. The slide-wire 55, contact 56 and battery 58 form a measuring device. The voltage obtained from the slide wire is introduced into the input circuit as a feedback voltage in such a sense that it balances the D.C. input voltage from the sensing element. A third reversible motor 62 can turn the crank 20 for adjusting the screen 19. For providing the excitation for the motors 57, 61 and 62, an additional amplifier 63 is connected beyond the amplifier 24 and demodulator 25. Three coupled switches 64, 65 and 66 are provided which can be set to three positions, a normal "running" position (a), an "adjustment" position (b) and a "standardizing" position (c).

In position (a), the switch 64 applies the input voltage from terminals 67 to the cells 3, 4, the switch 65 applies to the said cells a negative feedback voltage from the contact 56 of the self-balancing device and the switch 66 supplies the output of the amplifier 63 to the motor 57 of the said device. Under these conditions, the photocell converter and associated indicating, recording and/or control means will operate as described above and the self-balancing device will operate in well-known manner.

In position (b), the switch 64 disconnects the cells 3, 4 from the input and, like the switch 65, closes a link to the lower input connection of the amplifier 24, thus connecting the contacts at position (b) of the switches 64 and 65; the switch 66 supplies the output of the amplifier 63 to the motor 62 which adjusts the screen 19 until the responses of the cells 3 and 4 are balanced and there is no output from the amplifier 24 and, therefore, from the amplifier 63.

In position (c), the switch 64 applies a standard voltage, for example that of a standard cell 68, to one side of the cells 3, 4 in the place of the input voltage, the switch 65 applies to the other side of the said cells a reference voltage which is unaffected by the self-balancing device and the switch 66 supplies the output of the amplifier 63 to the motor 61 which adjusts the contact 60 until there is a condition of balance between the said reference voltage and the standard voltage.

With this arrangement, at desired intervals, the photo-cells 3, 4 can first be balanced in the "adjustment" position (b) and the reference voltage then standardized in the "standardizing" position (c). If required, however, provision might be made for carrying out these balancing and standardizing operations continuously. If desired, a single motor may be provided in place of the motors 57, 61 and 62 and the switch 66 may control the energisation of magnetic clutches for coupling the respective adjustment components thereto. Also, in place of the rotary motors diagrammatically indicated in Figure 4, solenoid-type motors may be used.

Instead of a light source of varying intensity, use may be made of a beam of light which is periodically interrupted by means of an electrically driven rotating or oscillating stop or stops or deflected by a mirror or mirrors. The frequency of interruption depends upon the speed of rotation or the number of vibrations and the number of openings in the screen or the like and may be adjusted not to fall within the range of A.C. supply frequency and its harmonics. To provide a reference phase for a phase-sensitive demodulator, the output of a third photocell arranged to be illuminated by the intermittent light may be amplified and supplied to the said demodulator.

As already indicated, measuring apparatus in accordance with the invention may include measuring instruments of indicating or recording type or self-balancing devices. However, measuring apparatus in accordance with the invention may also form part of known apparatus for the automatic control of ion concentration in conduits, closed or open vessels or the like, for instance by operating a valve device through electrical, mechanical, pneumatic or hydraulic means.

The invention is not limited in its application to measuring or control apparatus used in connection with glass electrodes. It may also be applied to electrode systems which employ, as reference electrode, a silver-chloride single crystal enclosing a conductor such as a silver wire.

We claim:

1. A converter for converting a D.C. input voltage into an output voltage of periodically varying magnitude, comprising a source of illumination, two light-responsive cells of the photo-emissive type arranged to be illuminated by the said source and connected in parallel and in opposition to each other, means for applying the D.C. voltage to the said cells, means for periodically modulating the intensity of illumination of the said cells by the said source, and adjustable optical stop means which is arranged in the illuminating path between the said source and cells and by which the distribution of light on the cells is adjustable for producing, by means of the cells themselves, an adjustable compensating voltage superimposed on the output.

2. Apparatus comprising a converter in accordance with claim 1 and a filter which is connected between the input and the cells and to which the difference between the input voltage and the output voltage of the converter is applied.

3. Apparatus in accordance with claim 1 and comprising automatic adjustment means operatively connected to the optical stop means and energisable in dependence upon the output voltage.

4. Apparatus as claimed in claim 1 and comprising a self-balancing device energisable in dependence upon the output voltage, means for supplying a reference voltage to the said self-balancing device, and automatic adjustment means operatively connected to the last-named means and energisable in dependence upon the output voltage for standardizing the reference voltage.

5. Apparatus comprising a converter in accordance with claim 1 and a resistor connected to the opposed cells to form a potential divider to which the D.C. voltage is applied and an amplifier to which the voltage of periodically varying magnitude is fed.

6. Apparatus in accordance with claim 5 and comprising a phase-sensitive demodulator which is connected to the said amplifier for converting the alternating output of the said amplifier into a D.C. voltage.

7. Apparatus in accordance with claim 6 and comprising a self-balancing device connected to the demodulator, means for supplying a reference voltage, a motor for adjusting the self-balancing device during normal running of the converter, a motor for adjusting the optical stop means, a motor for standardizing the reference voltage and three switches each having a normal running position, a position for adjustment of the optical stop means and a position for standardizing the reference voltage, one switch being adapted for applying to the converter either the D.C. input voltage for the normal running or a short circuit for the adjustment or a standard voltage for the standardizing, a second switch being adapted for applying to the converter a feedback voltage affected by the self-balancing device for the normal running or establishing a connection between the first and second switches for the adjustment or for applying the reference voltage to the converter for the standardizing, and a third switch being adapted for supplying an operating voltage, derived from the converter through the demodulator and amplifier, to the aforesaid motors severally for the normal running, stop-means adjustment and standardizing respectively.

8. Apparatus in accordance with claim 7, the standardizing positions of the three switches being located between the respective adjustment and normal-running positions, whereby standardizing of the reference voltage follows adjustment of the optical stop means upon successive movement of the switches from the adjustment position to the normal running position.

9. A converter for converting a D.C. input voltage into an output voltage of periodically varying magnitude, comprising a source of illumination, two light-responsive cells of the photo-emissive type arranged to be illuminated by the said source and connected in parallel and in opposition to each other, means for applying the D.C. voltage to the said cells, means for periodically modulating the intensity of illumination of the said cells by the said source, and means for balancing the said two cells comprising adjustable optical stop means which is arranged in the illuminating path between the said source and cells and by which the distribution of light on the cells is adjustable.

10. Ion-concentration measuring apparatus comprising a high-impedance ion-concentration sensing element and a converter for converting a D.C. input voltage obtained from the said element into an output voltage of periodically varying magnitude, comprising a source of illumination, two light-responsive cells of the photo-emissive type arranged to be illuminated by the said source and connected in parallel and in opposition to each other, means for applying the D.C. voltage to the said cells, means for periodically modulating the intensity of illumination of the said cells by the said source, and adjustable optical stop means which is arranged in the illuminating path between the said source and cells and by which the distribution of light on the cells is adjustable for producing, by means of the cells themselves, an adjustable compensating voltage superimposed on the output.

11. Apparatus according to claim 10 and comprising a meter circuit and means for compensating for the effect of temperature variation on the sensing element comprising a temperature-sensitive resistor connected to the meter circuit and adapted for varying the resistance of the said circuit.

12. Ion-concentration measuring apparatus comprising a high-impedance ion-concentration sensing element and a converter for converting a D.C. input voltage obtained from the said element into an output voltage of periodically varying magnitude, comprising a source of illumination, two light-responsive cells of the photo-emissive type arranged to be illuminated by the said source and connected in parallel and in opposition to each other, means for applying the D.C. voltage to the said cells, means for periodically modulating the intensity of illumination of the said cells by the said source, and means for providing a zero correction potential for compensating for asymmetry potential of the sensing element comprising adjustable optical stop means which is arranged in the illuminating path between the said source and cells and by which the distribution of light on the cells is adjustable for producing the compensating voltage by means of the cells themselves.

13. Apparatus comprising an ion-concentration sensing element of high impedance, such as a glass electrode, and a converter for converting the D.C. voltage obtained from the said element into a voltage of periodically varying magnitude, the said converter comprising a source of illumination, two light-responsive cells of the photo-emissive type arranged to be illuminated by the said source, a potential divider incorporating the two cells connected in parallel and in opposition to each other, means for applying the D.C. voltage to the potential divider, means for modulating the intensity of illumination of the said cells by the said source, means for providing a zero-corrective potential for compensating for asymmetry potential of the sensing element comprising adjustable optical stop means which is arranged in the illuminating path between the said source and cells and by which at least one of the cells can be partially occluded, an amplifier to which the voltage of periodically varying magnitude is fed, a demodulator connected to the amplifier and adapted for converting the output of the amplifier into a direct current for the operation of a measuring device connected to the said demodulator and for providing a negative feedback voltage, a filter on the input side of the converter, and means for applying the said feedback voltage to the said input in advance of the said filter.

References Cited in the file of this patent
UNITED STATES PATENTS

| | | |
|---|---|---|
| 2,367,746 | Williams | Jan. 23, 1945 |
| 2,372,062 | Dorsman | Mar. 20, 1945 |
| 2,459,730 | Williams | Jan. 18, 1949 |
| 2,547,662 | Rich et al. | Apr. 3, 1951 |
| 2,571,746 | Mouzon | Oct. 16, 1951 |